Patented Nov. 25, 1952

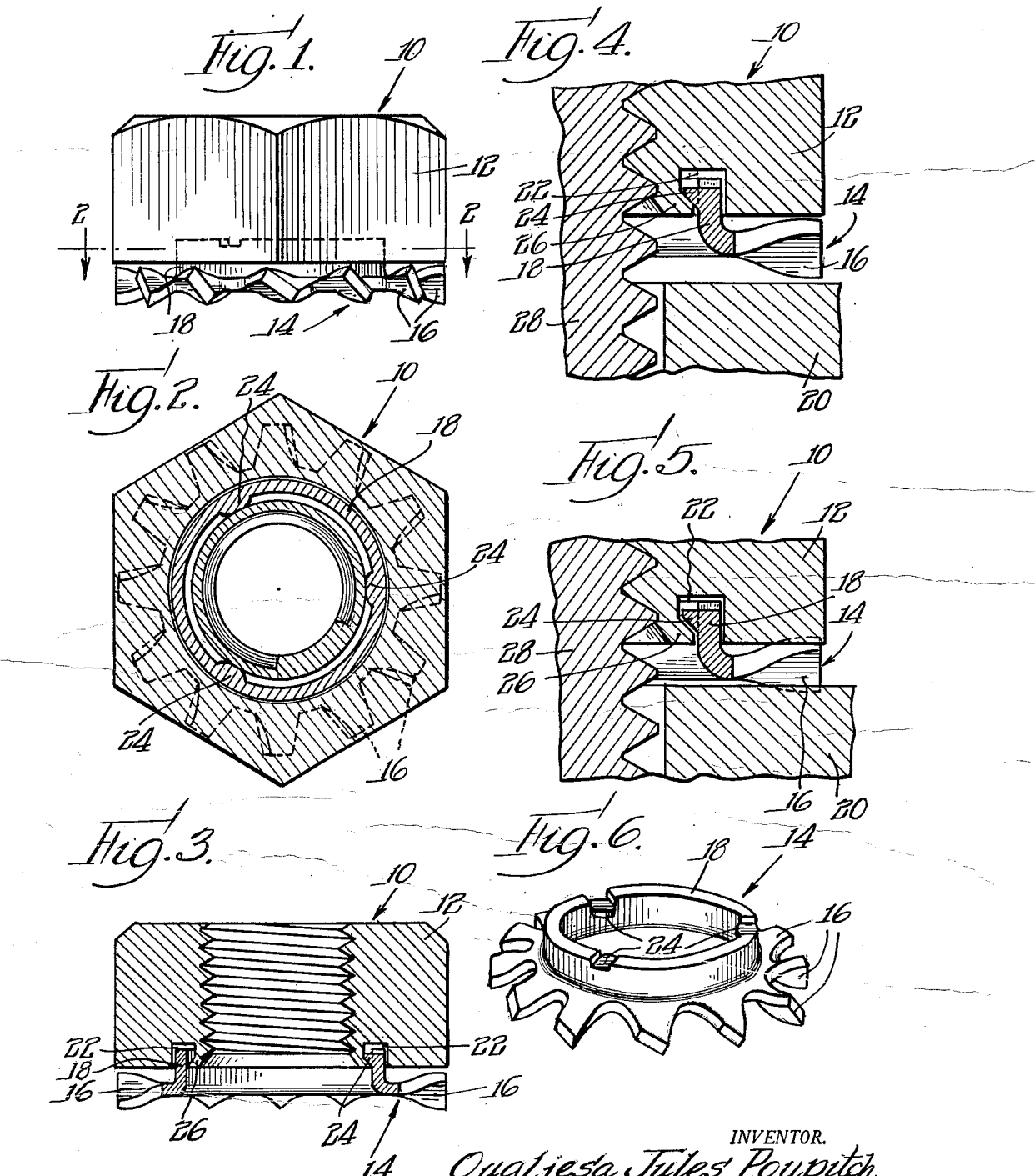

2,619,145

UNITED STATES PATENT OFFICE 2,619,145

COUPLED NUT AND LOCK WASHER

Ougljesa Jules Poupitch, Chicago, Ill., assignor to Illinois Tool Works, Chicago, Ill., a corporation of Illinois Application July 22, 1949, Serial No. 106,256

2 Claims. (Cl. 151—37)

This invention relates generally to fastener units, and more particularly to preassembled nuts and lock washers.

This invention is primarily concerned with fastener units incorporating a washer member in which the internal body thereof is displaced laterally to provide means for connecting the washer to a rotary threaded fastener, such as a nut. It is an object of the present invention to provide a fastener unit as set forth above in which the lock washer part consisting of outer marginal teeth supported by an annular internal body has an external diameter of minimum size, so as to assure maximum locking engagement of the washer teeth with the clamping surface of a complementary rotary threaded fastener or nut. To this end the washer member is formed with an internal annular sheet metal body extending substantially normal to the plane of the roots of the washer teeth, and the washer body is provided with retaining elements projecting radially inwardly into overlapping relation with a projection swaged radially outwardly from the body of the nut.

More specifically, the invention contemplates a fastener unit as set forth above, wherein the clamping surface of the rotary threaded member is provided with an annular groove extending inwardly from the clamping face thereof for accommodating the above mentioned annular washer body in such a manner as to assure rotatability and limited axial movement of the washer with respect to the clamping member.

Still more specifically, the invention contemplates a fastener unit such as a preassembled nut and lock washer, wherein the annular groove for accommodating the washer body is relatively shallow, and a plurality of retaining elements swaged radially inwardly from the free margin of said washer body cooperating with a complementary outwardly swaged projection on the nut to prevent axial separation of the parts.

The foregoing and other objects and advantages will be more apparent from the following detailed description when considered in connection with the accompanying drawing, wherein—

Fig. 1 is a side elevational view of a preassembled nut and lock washer, which is representative of one embodiment of the present invention;

Fig. 2 is a transverse sectional view of the fastener unit taken substantially along the line 2—2 of Fig. 1;

Fig. 3 is a central vertical sectional view of the fastener unit shown in Fig. 1;

Fig. 4 is an enlarged vertical sectional view of the lower right hand portion of the fastener unit of Fig. 3 shown in association with a screw and work piece just prior to the clamping engagement of the washer with the work piece;

Fig. 5 is a fragmentary sectional view similar to Fig. 4 showing the fastener unit tightened against the work; and Fig. 6 is a perspective view of the lock washer part of the fastener unit, said washer being disassociated from its complementary work member.

Referring now to the drawings more in detail wherein like numerals have been employed to designate similar parts throughout the various figures, it will be seen that one embodiment of the invention comprises a fastener unit designated generally by the numeral 10. The fastener unit 10 includes a nut member 12 and a sheet metal lock washer designated generally by the numeral 14. The lock washer 14 includes a plurality of resilient prongs 16 extending radially outwardly from and carried by one margin of an annular washer body 18. The washer body 18 is substantially cylindrical in shape and extends normal to the plane which is coincident with the roots of the prongs 16. Each prong 16 is deflected or twisted so as to present locking teeth which project beyond the bounding planes of the prong roots so that the teeth which are on the same side as the annular body 18 are adapted to engage the clamping surface of the nut 12 and the teeth disposed on the opposite sides are designed to lockingly engage the surface of a work piece 20.

The lock washer 14 is connected or coupled with the nut 12 by positioning the outer or attaching portion of the washer body 18 within an annular groove or relatively shallow recess 22 provided at the clamping side of the nut 12. When the attachment portion of the washer body 18 is initially positioned within the groove 20, said groove is wide enough to accommodate a plurality of retaining elements or lugs 24, preferably upset or swaged from the free margin of the body 18. In other words, when the washer body 18 and the circumferentially spaced retaining elements 24 are initially moved into association with the annular groove 22, the outer portion of the groove is of sufficient width to accommodate said retaining elements. The portion of the nut stock defining the inner side of the groove 22 is subsequently swaged radially outwardly so as to provide a radial shoulder or lip 26. Thus, the annular shoulder 26 projects radially outwardly and the retaining elements 24 project radially inwardly so as to secure the washer and nut against axial separation.

The depth of the groove 22 is sufficient to permit limited axial movement of the washer with respect to the nut as the fastener unit is moved from the unclamped position shown in Fig. 4 to its final or clamped position shown in Fig. 5. The annular body and walls defining the groove 22 cooperate in presenting bearing surfaces which not only permit the aforesaid relative axial movement of the parts, but also cooperate in preventing eccentric positioning thereof. Thus, the cylindrical washer wall is free to rotate within the groove, and yet the washer is maintained concentric with respect to the nut at all times.

By having the washer body extending substantially normal to the plane of the prong roots, it enables the use of the lock washer with clamping surfaces of minimum diameter. That is to say, by having a substantial portion of the washer body displaced axially, as distinguished from the conventional flat washer body, it is possible to, in effect, bring the washer teeth radially inwardly, thereby positioning the entire locking edges of the teeth in operative association with the clamping surface of the nut. At the same time the lock washer is freely rotatable and secured against axial separation from the nut. When washers having locking teeth of the type disclosed herein are employed, it is important that the washer be freely rotatable with respect to the nut, and at the same time free to be moved axially with respect to the nut to a limited extent during the tightening of the fastener unit against the work. This is illustrated in Figs. 4 and 5 where the fastener unit is mounted upon a screw member 28 and is in operative association with the work piece 30. In instances where it is desired to reduce to a minimum the external diameter of the lock washer, the entire washer body may extend out of the plane of the roots of the washer teeth.

The invention is hereby claimed as follows:

1. In a preassembled nut and washer including a sheet metal washer member having an inner body in the form of an axially extending substantially cylindrical continuous annular flange, a plurality of circumferentially spaced protuberances struck radially inwardly from the free margin of said flange to provide retaining means for the washer, said washer member having an outer axially compressible work engaging section extending radially outwardly from the base of said annular flange including an outer work engaging marginal portion positioned axially beyond a plane coincident with the base of said flange in position to engage a complementary work surface, a nut member having an annular groove disposed closely adjacent the threaded bore of the nut to leave a substantial clamping surface, a radially deformable skirt portion disposed radially interiorly of the clamping surface of the nut, said annular groove being defined by opposed wall surfaces extending axially inwardly from the clamping surface and providing a relatively wide entrance to the groove for facilitating inserting therein of the struck out protuberances on the free margin of the flange, said skirt portion being expanded radially outwardly after said insertion of said protuberances to reduce the width of the entrance to the groove and to approach and underlie said protuberances, thereby to prevent axial separation of the nut and washer, sufficient clearance being provided between the flange and the walls defining the groove to permit relative rotation between the nut and washer during the initial tightening of the assembly against a complementary work surface.

2. A preassembled nut and washer as set forth in claim 1 wherein the radially expanded portion of the skirt underlying the protuberances of the washer presents a shoulder extending axially inwardly from a plane coincident with the clamping surface of the nut.

OUGLJESA JULES POUPITCH.

REFERENCES CITED

The following references are of record in the file of this patent:

UNITED STATES PATENTS

| Number | Name | Date |
| --- | --- | --- |
| 1,847,314 | Stoll | Mar. 1, 1932 |
| 1,924,695 | Olson | Aug. 29, 1933 |
| 1,944,595 | Crowther | Jan. 23, 1934 |
| 2,225,654 | Olson | Dec. 24, 1940 |
| 2,407,314 | Mason | Sept. 10, 1946 |
| 2,457,945 | Von Soden | Jan. 4, 1949 |
| 2,576,906 | Poupitch | Nov. 27, 1951 |

FOREIGN PATENTS

| Number | Country | Date |
| --- | --- | --- |
| 1,315 of 1901 | Great Britain | Jan. 21, 1901 |